United States Patent
Cho et al.

(10) Patent No.: US 9,678,354 B2
(45) Date of Patent: Jun. 13, 2017

(54) GLASSLESS MULTI-VIEW DISPLAY APPARATUS AND CONTROL METHOD THEREOF

(71) Applicant: SAMSUNG ELECTRONICS CO., LTD., Suwon-si (KR)

(72) Inventors: Hyun-seung Cho, Anyang-si (KR); Jung-hoon Yoon, Seongnam-si (KR); Seon-deok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 14/542,708

(22) Filed: Nov. 17, 2014

(65) Prior Publication Data

US 2015/0301350 A1 Oct. 22, 2015

(30) Foreign Application Priority Data

Apr. 18, 2014 (KR) .................... 10-2014-0046787

(51) Int. Cl.
*G02B 27/26* (2006.01)
*G02B 27/22* (2006.01)
*H04N 13/04* (2006.01)

(52) U.S. Cl.
CPC ......... *G02B 27/26* (2013.01); *G02B 27/2214* (2013.01); *G02B 27/2264* (2013.01); *H04N 13/0413* (2013.01); *H04N 13/0445* (2013.01)

(58) Field of Classification Search
CPC G02B 27/2264; G02B 27/26; G02B 27/2214; H04N 13/0413; H04N 13/0445

USPC .......................................... 359/455, 463–476
See application file for complete search history.

(56) References Cited

U.S. PATENT DOCUMENTS

| | | | |
|---|---|---|---|
| 2007/0165305 A1* | 7/2007 | Mehrle | G02B 27/2214 359/464 |
| 2008/0278640 A1* | 11/2008 | Ijzerman | G02B 5/0242 349/15 |
| 2010/0225747 A1* | 9/2010 | Chen | G09G 3/003 348/51 |

* cited by examiner

*Primary Examiner* — Scott J Sugarman
*Assistant Examiner* — Mustak Choudhury
(74) *Attorney, Agent, or Firm* — Sughrue Mion, PLLC (57) ABSTRACT

A display apparatus is provided. The display apparatus includes a display panel comprising a plurality of pixels including a plurality of sub-pixels, and arranges and displays a multi-view image in an arrangement pattern. The display panel includes a polarizing film disposed on a back surface of the display panel and which transmits, to the display panel, light having a first polarization direction to an area corresponding to a first part of each of the sub-pixels, and light having a second polarization direction to an area corresponding to a second part of the sub-pixels. a polarizing panel disposed on a back surface of the polarizing film and configured to adjusts the first and second polarization directions of the light transmitted by the polarizing film, and a controller configured to control a driving state of the polarizing panel to sequentially provide the first and second polarization directions for one image frame section.

20 Claims, 8 Drawing Sheets

GLASSLESS MULTI-VIEW DISPLAY APPARATUS AND CONTROL METHOD THEREOF

CROSS-REFERENCE TO RELATED APPLICATION(S)

This application claims priority from Korean Patent Application No. 10-2014-0046787, filed on Apr. 18, 2014 in the Korean Intellectual Property Office, the disclosure of which is incorporated herein by reference in its entirety.

BACKGROUND

1. Field

Methods and apparatuses consistent with exemplary embodiments relate to providing a display apparatus and a control method thereof, and more particularly, to providing a glassless multi-view image display apparatus and a control method thereof.

2. Description of the Related Art

The development of electronic technologies has brought the development and distribution of various types of electronic devices. In particular, a display apparatus, such as a television (TV), which is one of many appliances widely used in homes, has been developed.

As the quality and performance of display apparatuses has improved, the types of contents displayed on the display apparatus have variously increased. In particular, stereoscopic display systems through which three-dimensional (3D) contents may be viewed have been developed and distributed.

A stereoscopic display system may be classified into a glass type system and a glassless type system according to whether glasses for viewing 3D images are used.

As an example of the glass type system, there is a shutter glass type display apparatus. A shutter glass type refers to a type of display apparatus that alternately outputs left and right eye images, and alternately opens and closes left and right shutter glasses of 3D glasses worn by a user in order to enable a user to feel a 3D effect.

The glassless type system is also referred to as an autostereoscopy system. A glassless 3D display apparatus displays multi-view images that are optically separated and projects light corresponding to images having different views onto left and right eyes of a viewer by using a parallax barrier technology or a 3D filter separating visual fields such as a lenticular lens in order to enable a user to feel a 3D effect.

Figure 1:
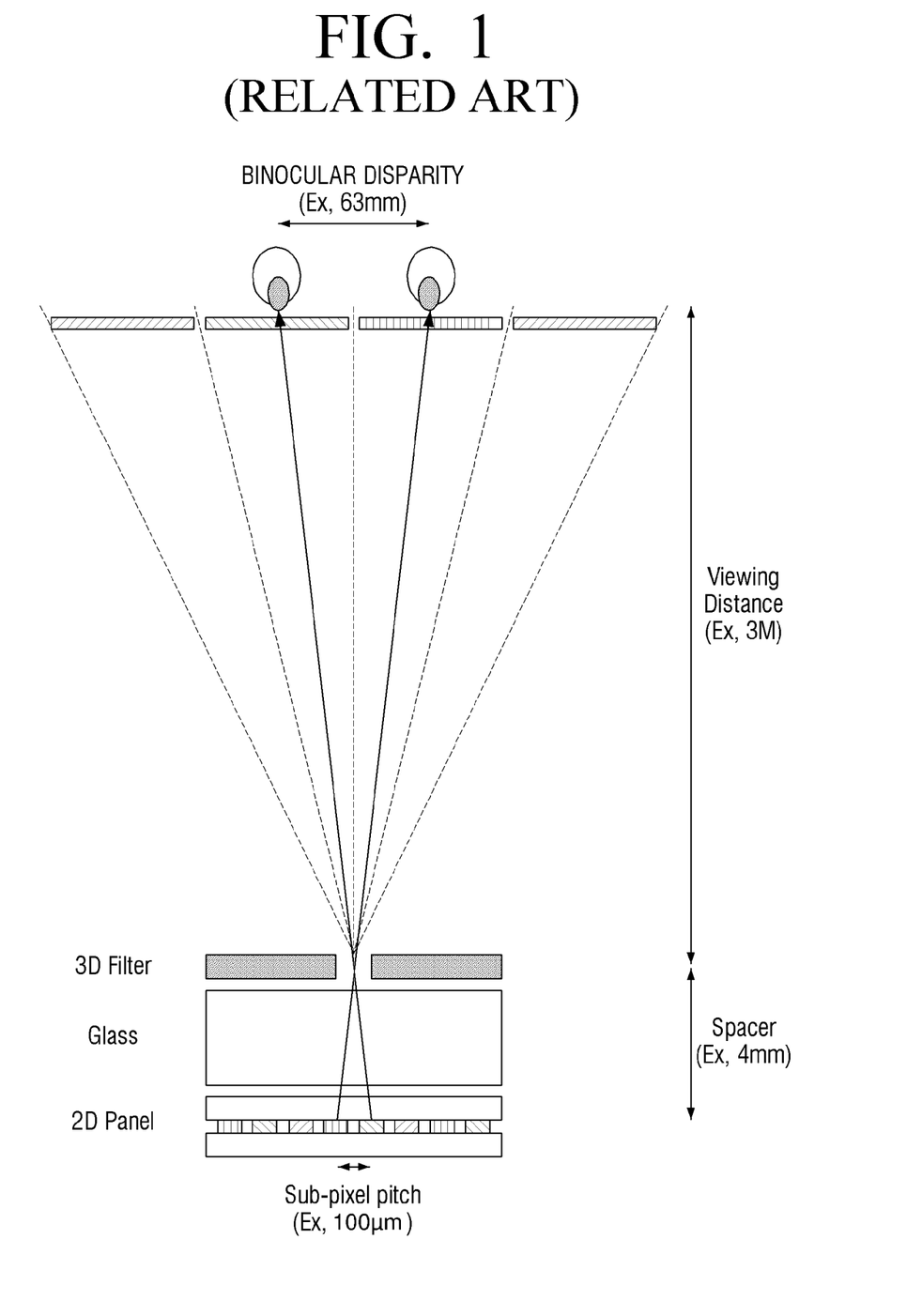
FIG. 1 is a view illustrating a structure of a related art glassless type system.

FIG. 1 is a view illustrating a structure of a related art glassless type system.

The existing glassless type system uses a 3D filter, which separates visual fields and is manufactured in the same size as the number of sub-pixels of a two-dimensional (2D) panel corresponding to the number of necessary visual fields, above the 2D panel displaying an image in order to form visual fields. For example, in a multi-view system, a relation between binocular disparities (Pixel Pitch=Viewing Distance: Spacer (distance between 2D Panel and 3D filter) is formed. Therefore, if a binocular disparity of a human is 63 mm to form visual fields at a viewing distance of 3 m, a distance between the 2D panel and the 3D filter is required to be 4 mm. Also, a flat medium such as glass or the like is used to maintain the distance between the 2D panel and the 3D filter. Therefore, the formation of the visual fields in the multi-view system is possible, but glass is used. As a result, the multi-view system becomes weighty. Also, a size of a sub-pixel increases with an increase in the size of the 2D panel, and thus the distance between the 2D panel and the 3D filter increases. Therefore, a tolerance of the glass increases with an increase in a thickness of the glass, and thus uniformity of the glass decreases. As a result, a 3D performance is lowered.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that reduces a thickness of a medium by maintaining a distance between a 2D panel and a 3D filter by using a polarizing film and a polarizing panel and maintains a 3D performance, and a control method thereof.

According to an aspect of an exemplary embodiment, there is provided a display apparatus comprising: a display panel configured to include a plurality of pixels, and arrange and display a multi-view image in an arrangement pattern; each of the plurality of pixels including a plurality of sub-pixels; a polarizing film disposed on a back surface of the display panel and configured to transmit, to the display panel, light having a first polarization direction to an area corresponding to a first part of each of the sub-pixels, and light having a second polarization direction to an area corresponding to a second part of each of sub-pixels; a polarizing panel disposed on a back surface of the polarizing film and configured to adjust the first polarization direction and the second polarization direction of light transmitted by the polarizing film; and a controller configured to control a driving state of the polarizing panel to sequentially provide the first polarization direction and the second polarization direction for one image frame section.

The polarizing film is configured to transmit light having the first polarization direction in a first half of each of the sub-pixels and transmit light having the second polarization direction in a second half of each of the sub-pixels. The controller is configured to control the driving state of the polarizing panel to sequentially provide the first polarization direction in a first half of sub-pixels in a first sub field section comprising the first half of each of the sub-pixels for the one image frame section and provide the second polarization direction in a second sub field section comprising the second half of each of the sub-pixels for the one image frame section, and the second polarization direction is perpendicular to the first polarization direction.

The controller is configured to provide a multi-view image displayed in the first half of each of the sub-pixels in the first sub field section and a multi-view image displayed in the second half of each of the sub pixels in the second sub field section for the one image frame section.

The polarizing panel comprises an active retarder configured to switch P waves and S waves.

The display apparatus may further comprise a backlight unit disposed on a back surface of the polarizing panel and configured to emit light. The polarizing panel is configured to sequentially provide the polarizing film with the light emitted from the backlight unit in the first polarization direction and the second polarization direction for the one image frame section.

The display apparatus may further comprise a visual field divider disposed on the display panel and configured to provide different views according to viewing areas based on the multi-view image.

The display apparatus may further comprise a glass unit disposed between the visual field divider and the display panel.

According to an aspect of another exemplary embodiment, there is provided a method of controlling a display apparatus comprising a display panel comprising a plurality of pixels, and arranges and displays a multi-view image in a preset arrangement pattern, and a polarizing film disposed on a back surface of the display panel and transmits to the display panel light having different polarization directions and a polarizing panel disposed on a back surface of the polarizing film, the comprising: driving the polarizing panel to provide to the polarizing film light having a first polarization direction corresponding to at least a first part of each of the sub-pixels constituting the plurality of pixels in a first sub field section of one image frame section; and driving the polarizing panel to provide to the polarizing film light having a second polarization direction corresponding to a second part of each of the sub-pixels constituting the plurality of pixels in a second sub field section of the one image frame section.

The polarizing film transmits light having the first polarization direction in a first half of each of the sub-pixels, and transmits light having the second polarization direction in the second half of each of the sub-pixels. The polarizing panel is driven to sequentially provide the first polarization direction in the first sub field section and provide the second polarization direction in the second sub field section.

The polarizing panel is an active retarder configured to switch P waves and S waves.

The display apparatus may further comprise a back light unit (BLU) disposed on a back surface of the polarizing panel in order to emit light. The polarizing panel is driven to sequentially provide the polarizing film with the light emitted from the BLU in the first polarization direction and the second polarization direction for the one image frame section.

The display apparatus may further include a visual field divider disposed on a front surface of the display panel and configured toto provide different views according to viewing areas based on a multi-view image.

The display apparatus may further include a glass unit disposed between the visual field divider and the display panel.

According to an aspect of another exemplary embodiment, there is provided a display apparatus comprising a display panel which comprises a plurality of pixels and is configured to display a multi-view image in a predetermined arrangement pattern, each of the plurality of pixels including a plurality of sub-pixels; a polarizing film which is disposed on the display panel, and is configured to transmit, to the display panel, light having a first polarization direction in an area corresponding to a first half of a sub-pixel of the plurality of sub-pixels, and to transmit light having a second polarization direction in an area corresponding to a second half of the sub-pixel; a polarizing panel which is disposed on the polarizing film and configured to provide the light having the first and second polarization directions to the polarizing film; and a visual field divider which is disposed on the display panel and is configured to provide the multi-view image.

The display apparatus further comprises a controller configured to control a driving state of the polarizing panel.

The visual field divider is at least one of a lenticular lens and a parallax barrier.

The first polarization direction is perpendicular to the second polarization direction.

The polarizing panel comprises an active retarder configured to switch P waves and S waves.

The display apparatus further comprises a glass unit disposed between the visual field divider and the display panel.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
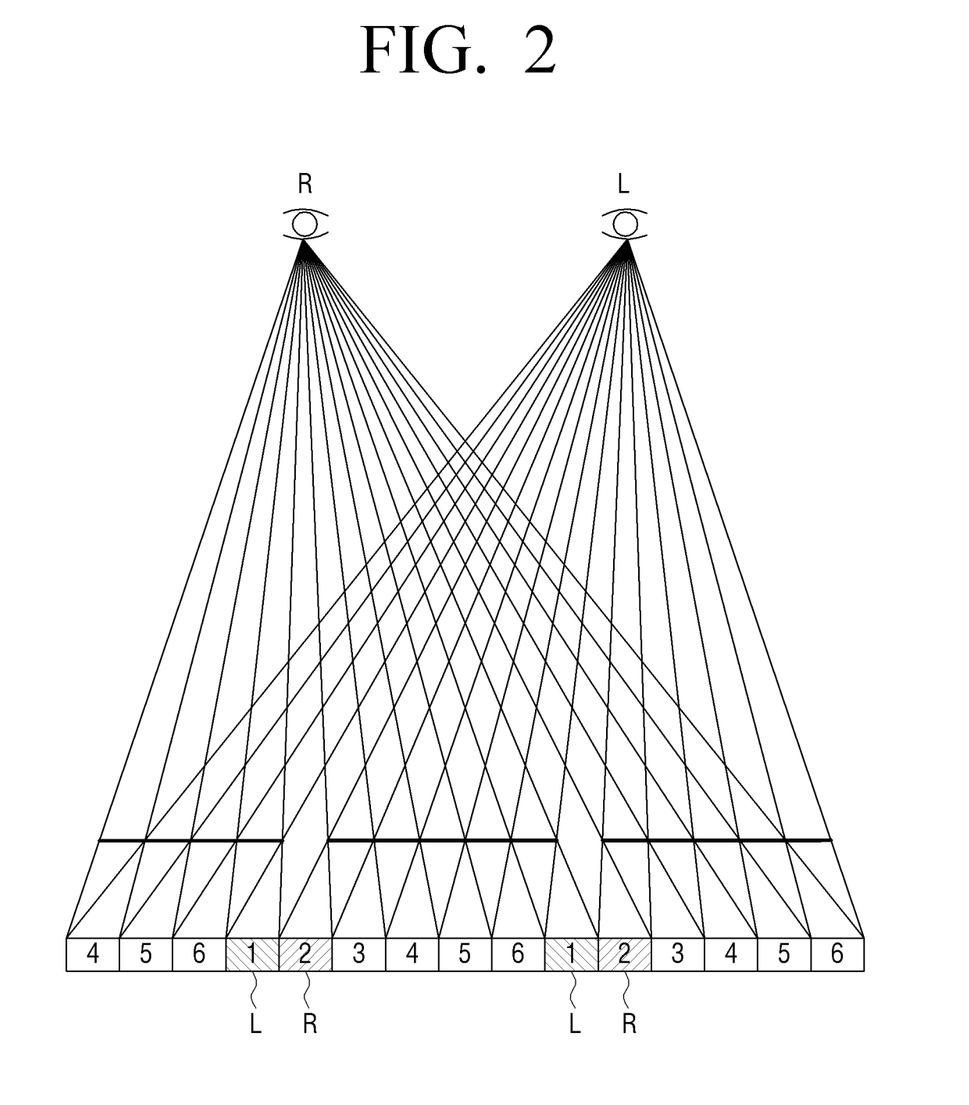
FIG. 2 is a view illustrating an operation of a glassless 3D display apparatus, according to an exemplary embodiment.

FIG. 2 is a view illustrating an operation of a glassless 3D display apparatus, according to an exemplary embodiment.

FIG. 2 illustrates a method of operating an apparatus that displays a multi-view image to provide a 3D image in a glassless mode. Here, the multi-view image includes a plurality of images that are acquired by capturing an object at different angles. In other words, the plurality of images that are captured at the different angles are refracted at different angles and focused in various positions (e.g., about 3 meters) keeping a preset distance that is referred to as a viewing distance. Positions in which such images are formed are referred to as viewing areas. Therefore, if one eye of a user is positioned in a first viewing area, and the other eye is positioned in a second viewing area, the user may achieve a 3D effect.

For example, FIG. 2 is a view illustrating an operation of displaying a multi-view image having a total of six views. Referring to FIG. 2, the glassless 3D display apparatus may project light corresponding to an image having a first view of six views onto a left eye and light corresponding to an image having a second view of the six views onto a right eye. Therefore, the user may view images having different views with the left and right eyes to achieve a 3D effect.

Figure 3A:
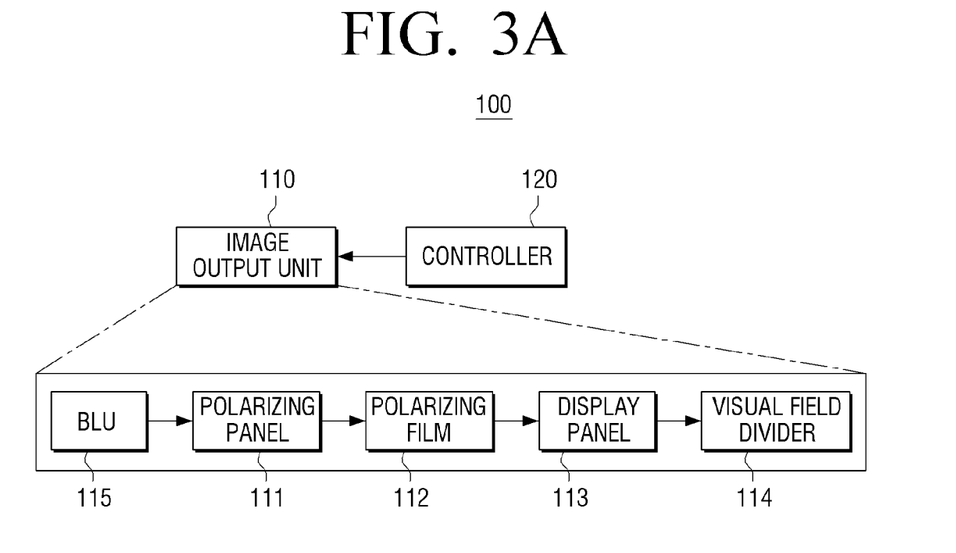
FIG. 3A is a block diagram illustrating a structure of a display apparatus, according to an exemplary embodiment.

FIG. 3A is a block diagram illustrating a structure of a display apparatus 100, according to an exemplary embodiment.

Referring to FIG. 3A, the display apparatus 100 may be realized as various types of display apparatuses such as a TV, a monitor, a portable phone, a personal computer (PC), a set-top PC, a kiosk PC, an electronic frame, etc.

The display apparatus 100 includes an image output unit 110 and a controller 120.

The image output unit 110 provides a multi-view (or a multi optical view). The image output unit 110 includes a polarizing panel 111, a polarizing film 112, a display panel 113, and a visual field divider 114 that provide the multi-view.

The display panel 113 includes a plurality of pixels which include a plurality of sub-pixels. Here, the sub-pixels may include red (R), green (G), and blue (B) sub-pixels. In other words, pixels including R, G, and B sub-pixels may be arrayed in a plurality of rows and a plurality of columns to constitute the display panel 113. In this case, the display panel 113 may be realized as various types of display units such as a liquid crystal display (LCD) panel, a plasma display panel (PDP), an organic light-emitting diode (OLED), a vacuum fluorescent display (VFD), a field emission display (FED), an electro luminescence display (ELD), etc.

The display panel 113 displays an image frame. In detail, the display panel 113 may display an image frame in which a plurality of images which have different views are sequentially and repeatedly arrayed.

The visual field divider 114 may be disposed on a front surface of the display panel 113 to provide different views according to viewing areas, i.e., a multi-view. In this case, the visual field divider 114 may be realized as a lenticular lens or a parallax barrier.

For example, the visual field divider 114 may be realized as a lenticular lens including a plurality of lens areas. The lenticular lens is an array of magnifying lenses which, when viewed from different angles, magnify the different images. Therefore, the lenticular lens may refract an image displayed on the display panel 113 through the plurality of lens areas. Each of the lens areas may be formed in a size corresponding to at least one pixel to differently disperse light penetrating each pixel according to the viewing areas.

As another example, the visual field divider 114 may be realized as a parallax barrier. The parallax barrier is a device which, when placed in front of an image source, such as a liquid crystal display, allows it to show a stereoscopic image or multi-view image without the need for the viewer to wear 3D glasses. The parallax barrier allows each eye to see a different set of pixels, so creating a sense of depth. The parallax barrier is realized as a transparent slit array including a plurality of barrier areas. Therefore, the parallax barrier may block light transmitted through the slits positioned between the barrier areas to emit images having different views according to the viewing areas.

The visual field divider 114 may be arranged to slant at a preset angle in order to improve an image quality. The controller 120 may divide a multi-view image into images based on an angle at which the visual field divider 114 slants, and combine the images to generate an image frame. Therefore, the user may view an image that is displayed with a preset inclination with respect to the sub-pixels of the display panel 113, not an image that is displayed in a vertical or horizontal direction with respect to the sub-pixels.

The polarizing film 112 is disposed on a back surface of the display panel 113 and transmits light having different polarization directions in areas corresponding to portions of the sub-pixels of the plurality of pixels. For example, the polarizing film 112 may be realized to include vertically and horizontally linearly polarizing films.

In detail, the polarizing film 112 may be constituted to transmit light having a first polarization direction, e.g., light having a vertical polarization direction, in a first half of each of the sub-pixels of the plurality of pixels, and transmit light having a second polarization direction perpendicular to the first polarization direction, e.g., light having a horizontal polarization direction, in the second half of each of the sub-pixels.

The polarizing panel 111 is disposed on a back surface of the polarizing film 112 and may adjust a polarization direction provided to the polarizing film 112. For example, the polarizing panel 111 may be realized as an active retarder that enables a polarize switching (PS).

Here, the polarizing panel 111 may be realized as a linear polarization type, a circular polarization type, or an elliptical polarization type. However, for convenience of description, the polarizing panel 111 will be described as being realized as the linear polarization type.

The polarizing panel 111 may operate in a low band and/or a high band to provide different polarization directions. For example, if vertically linearly polarized light is incident, and the active retarder operates in the low band, the vertically linearly polarized light is changed in a 90° direction. Therefore, the vertically linearly polarized light is changed into horizontally linearly polarized light, and the vertically linearly polarized light may be transmitted without being changed in the high band.

The controller 120 controls an overall operation of the display apparatus 100.

In particular, the controller 120 may control a driving state of the polarizing panel 111 to sequentially provide different polarization directions for one image frame section displayed on the display panel 113. Here, the different polarization directions may correspond to different polarization directions in which the polarizing film 112 respectively transmits light in areas corresponding to at least some of the sub-pixels of the plurality of pixels.

Specifically, if the polarizing film 112 transmits light having a vertical polarization direction in a first half of each of the sub-pixels of the plurality of pixels and transmits light having a horizontal polarization direction perpendicular to the vertical polarization direction in the second half of each of the sub-pixels of the plurality of pixels, the controller 120 may control the driving state of the polarizing panel 111 to sequentially provide the vertical polarization direction in a first sub field section and the horizontal polarization direction in a second sub field section for one image frame section.

Therefore, the controller 120 may control to provide a multi-view image displayed in a first half of each of the sub-pixels in the first sub field section of an image frame, and a multi-view image displayed in the second half of each of the sub-pixels in the second sub field section for one image frame section. Also, the user may be sequentially provided with a first half of a whole visual field and then the second half of the whole visual field for one image frame section.

The display apparatus 100 may further include a backlight unit (BLU) 115 that is disposed on the back surface of the polarizing panel 111 to emit light. Here, one of a white light-emitting diode (LED) and a color LED may be used as a light source of the BLU 115.

In this case, the polarizing panel 111 may sequentially provide light, which is emitted from the BLU, to the polarizing film 112 in different polarization directions for one image frame section.

Also, the display apparatus 100 may further include a glass unit that is disposed between the visual field divider 114 and the display panel 113.

Figure 3B:
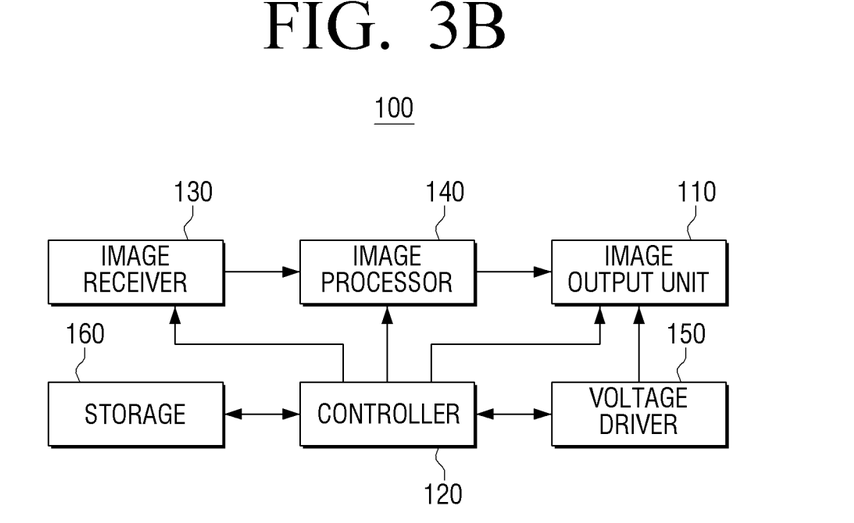
FIG. 3B is a block diagram illustrating a structure of a display apparatus, according to another exemplary embodiment.

FIG. 3B is a block diagram illustrating a structure of a display apparatus 100, according to another exemplary embodiment.

Referring to FIG. 3B, the display apparatus 100 includes an image output unit device 110, a controller 120, an image receiver 130, an image processor 140, a voltage driver 150, and a storage 160. Detailed descriptions of the same elements of FIG. 3B as those described in FIG. 3A are omitted.

An image input device (not shown) receives an image and depth information. In detail, the image input device may receive the image and the depth information of the image from various types of external apparatuses such as an external storage medium, a broadcasting station, a web server, etc. Here, the received image is one of a single view image, a stereoscopic image, and a multi-view image. The single view image is an image that is captured by a general photographing apparatus, and the stereoscopic image is a 3D video image that is expressed only with left and right eye images, i.e., a 3D image that is captured by a stereoscopic photographing apparatus. In general, the stereoscopic photographing apparatus is used to capture a 3D image with a photographing apparatus including two lenses. The multi-view image refers to a 3D video image that is formed by geometrically correcting and spatially synthesizing images captured through one or more photographing apparatuses to provide various views of several directions to a user.

The image input device may also receive the depth information of the image. In general, a depth of the image is a depth value given to each of the pixels of the image, for example, a depth of 8 bits may have grayscale values between 0 and 255. For example, when the depth is represented with black and/or white colors, the black color (a low value) may indicate an image which is distant from a viewer, and the white color (a high value) may indicate an image which is close to the viewer.

The depth information refers to information indicating a depth of a 3D image, i.e., information corresponding to a binocular disparity degree between left and right eye images constituting the 3D image. A degree of a 3D effect felt by a person varies according to the depth information. In other words, if the depth is large, a binocular disparity is large, and thus the 3D effect is felt relatively large. If the depth is small, the binocular disparity is small, and thus the 3D effect is felt relatively small. The depth information may be generally acquired through a passive method using only a 2D feature of an image such as stereo matching and an active method using an apparatus such as a depth camera. The depth information may be in the form of a depth map. A depth map refers to a table including depth information of each area of an image. Areas may be divided in pixel units and may be defined as preset areas larger than the pixel units. For example, the depth map may indicate 127 or 128 of grayscale values between 0 and 255 as a reference value, i.e., 0 (or focal plane), to indicate a value smaller than 127 or 128 as a negative value and indicate a value larger than 127 or 128 as a positive value. A reference value of the focal plane may be arbitrarily selected between 0 and 255. The negative value indicates sinking, and the positive value indicates projecting. A depth map may also be an image or image channel that contains information relating to the distance of the surfaces of scene objects from a viewpoint.

The image processor 140 may render the multi-view image based on the depth information.

In detail, in case of a 2D image, the image processor 140 may render a multi-view image based on depth information extracted from a 2D and/or 3D conversion. Alternatively, if a multi-view, i.e., N views, and corresponding N depth information are input, the image processor 140 may render a multi-view image based on at least one view of the inputted N views and at least one piece of the N depth information. Also, if only the N views are input, the image processor 140 may extract depth information from the N views and render a multi-view image based on the extracted depth information.

However, the above-described detailed operation of the image processor 140 is only an example, and the image processor 120 may render a multi-view image through various methods besides the above-described operation.

The voltage driver 150 generates a driving voltage and provides the driving voltage to the image output unit 110.

In detail, the voltage driver 150 may provide a voltage to the polarizing panel 111 under control of the controller 120.

The storage 160 is a storage medium that stores various types of programs necessary for operating the display apparatus 100 and may be realized as a memory, a hard disk drive (HDD), or the like.

Figure 4:
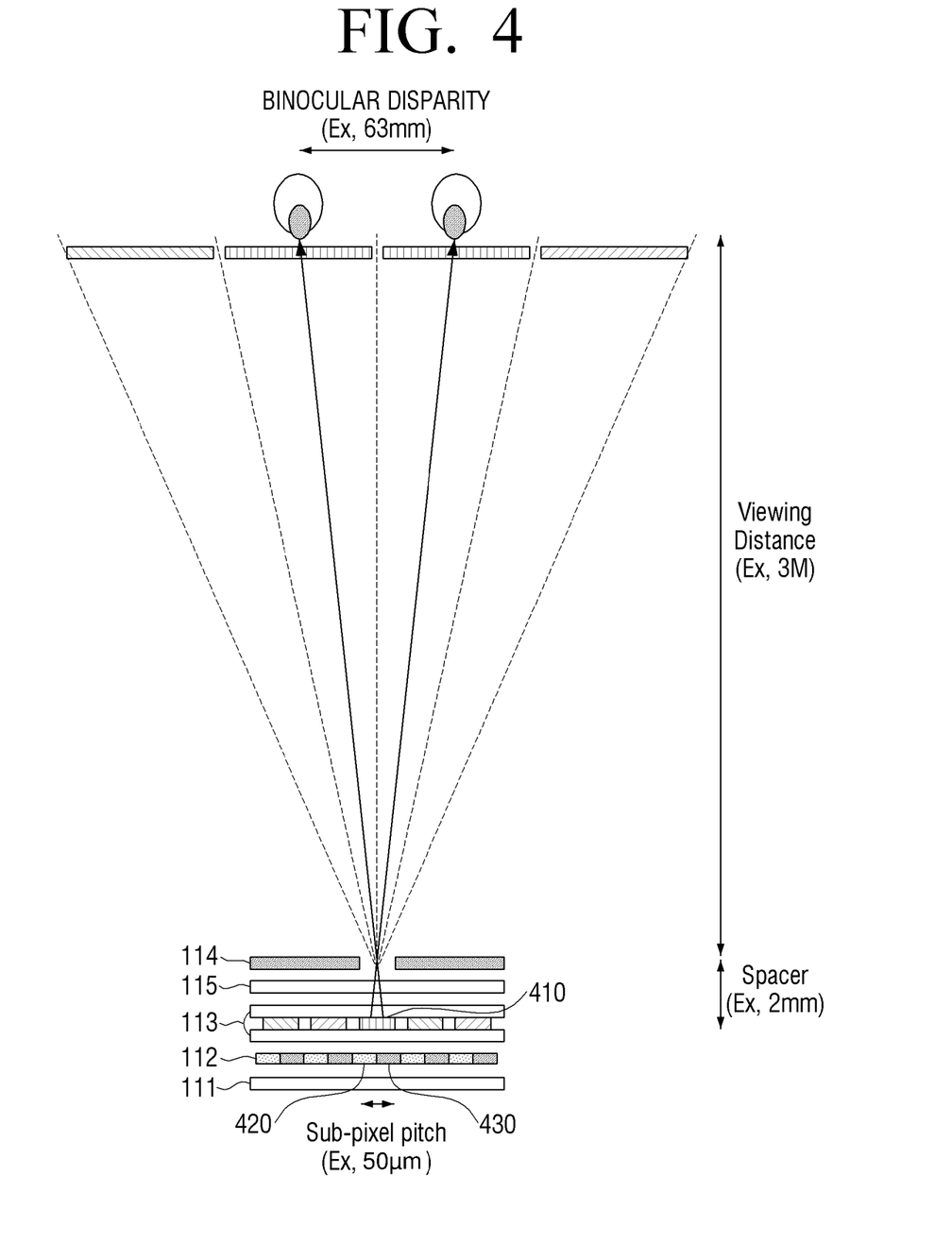
FIG. 4 is a view illustrating a structure of a display apparatus, according to an exemplary embodiment.

FIG. 4 is a view illustrating a structure of a display apparatus, according to an exemplary embodiment.

As shown in FIG. 4, the polarizing panel 111, the polarizing film 112, the display panel 113, and the visual field divider 114 may be sequentially disposed, and a glass unit 115 may be disposed between the display panel 113 and the visual field divider 114. However, the glass unit 115 may be omitted. For example, if it is possible to realize a visual field corresponding to a binocular disparity without the glass unit 115, the glass unit 115 may be omitted.

The display panel 113 may include a plurality of pixels, each of which may include R, G, and B sub-pixels. Here, a distance between the sub-pixels may be 50 μm but is not limited thereto.

In this case, the polarizing film 112 may transmit light having a first polarization direction in an area 420 corresponding to a first half of one sub-pixel 410 and transmit light having a second polarization direction in an area 430 corresponding to the second half of the sub-pixel 410. Here, the second polarization direction may be a direction perpendicular to the first polarization direction.

The polarizing panel 111 may sequentially provide light having the first and second polarization directions respectively corresponding to the areas 420 and 430 respectively transmitting the first and second polarization directions constituting the polarizing film 112 for one image frame section. For example, a polarization switch (PS) panel may be used as the polarizing panel 111 and may alternately switch P waves and S waves for one image frame section under control of the controller 120.

The S-wave is a type of elastic wave which moves as a shear or transverse wave, so motion is perpendicular to the direction of wave propagation. The mode of propagation of the P-wave is longitudinal. When an S-wave or P-wave strikes an interface at an angle other than 90 degrees, a phenomenon known as mode conversion occurs.

In the structure of the display apparatus described above, an image provided in one sub-pixel may be divided to be sequentially provided to left and right eyes of a user. Therefore, a 3D image may be realized without increasing a distance between a visual field divider, e.g., a 3D filter, and a display panel, i.e., a 2D panel. As a result, a 3D image having a high resolution may be realized by reducing the distance between the 3D filter and the 2D panel to 2 mm or less.

A method of driving a display apparatus as shown in FIG. 4 will now be described in detail with reference to the drawings.

Figure 5A:
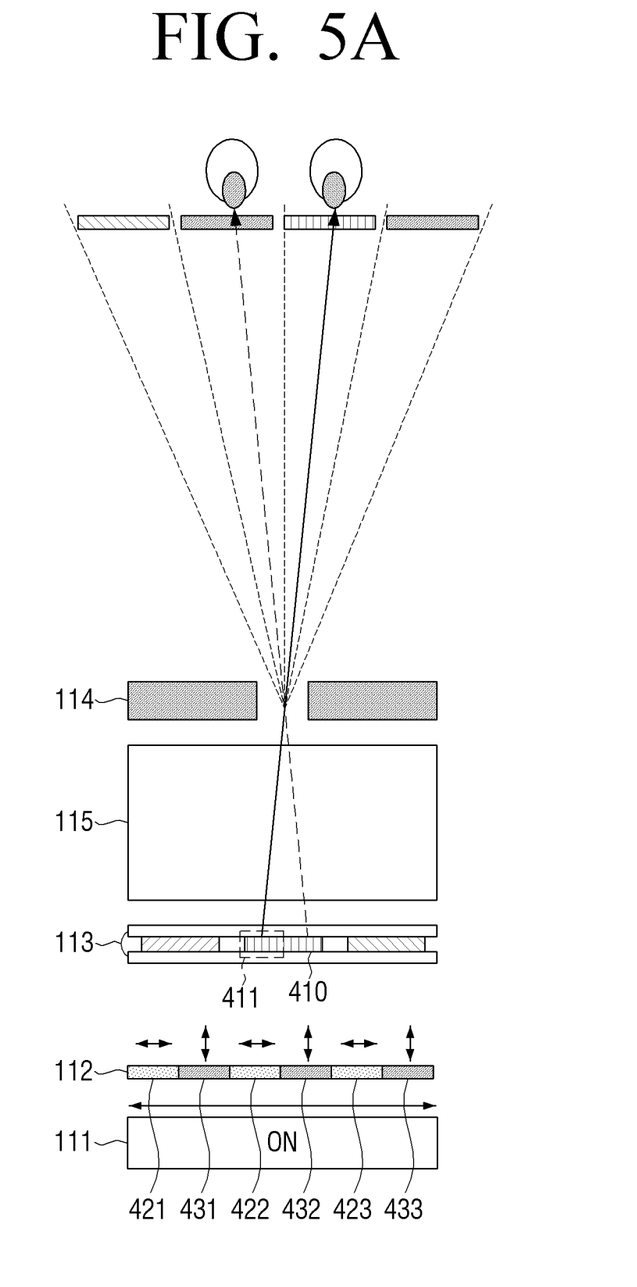
FIGS. 5A and 5B are views illustrating a method of driving a display apparatus, according to an exemplary embodiment.
Figure 5B:
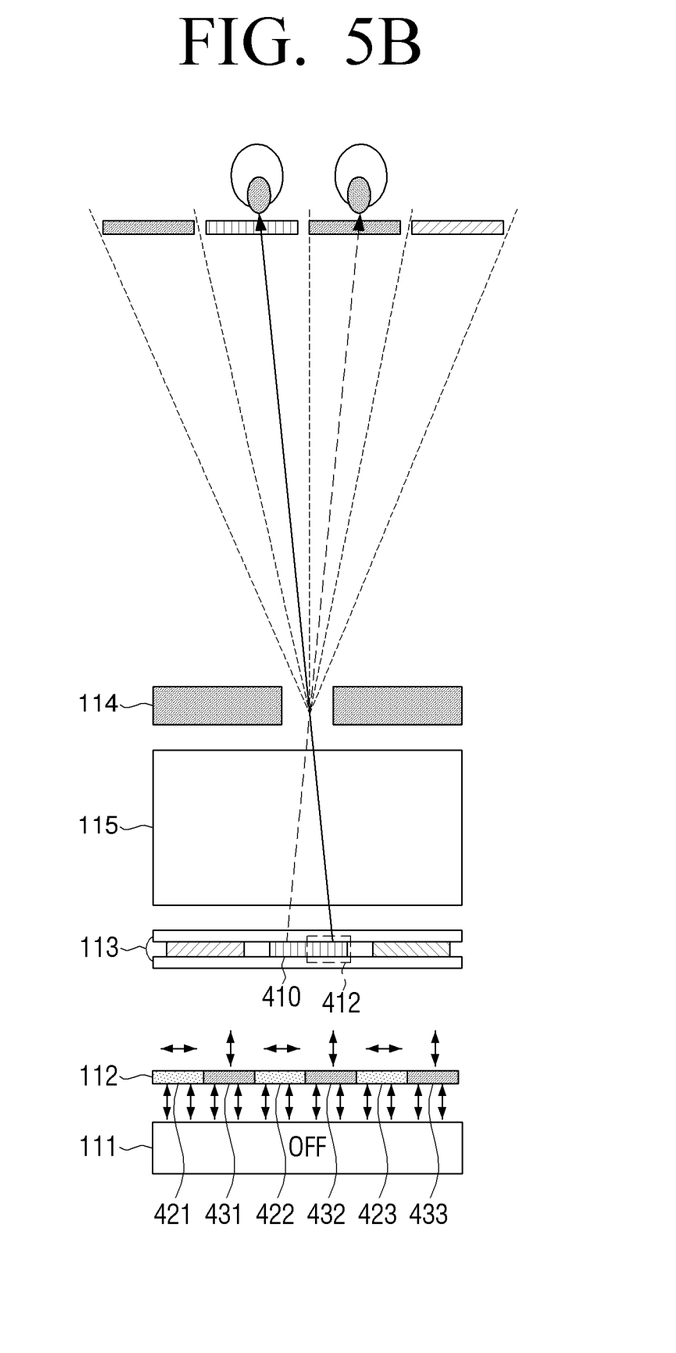

FIGS. 5A and 5B are views illustrating a method of driving a display apparatus, according to an exemplary embodiment.

Unpolarized light of a BLU (not shown) may have particular polarized light (ordinary rays and/or extraordinary rays) through the display panel 113, e.g., an LCD panel, and the polarizing panel 111 may be driven to maintain or change the particular polarized light.

In detail, as shown in FIG. 5A, the polarizing panel 111 may be turned on in a first sub field section for one image frame section, and thus light provided from the BLU may be output in the same direction as a transmission axis of the polarizing film 112. Therefore, light may be output with respect to a half of each sub-pixel.

For example, as shown in FIG. 5A, as the polarizing panel 111 is turned on, the light provided from the BLU may have a polarization direction of "↔" and may be output with respect to only areas 421, 422, and 423 of the polarizing film 112 corresponding to the corresponding polarization direction. For example, the light provided from the BLU penetrates only the area 422 of the polarizing film 112 corresponding to a first half 411 of a sub-pixel 410, and thus light corresponding to the first half 411 of the sub-pixel 410 is incident onto one of left and right eyes of a user.

As shown in FIG. 5B, the polarizing panel 111 is turned off in a second sub field section, and thus light provided from the BLU may be output in the same direction as an absorption axis of the polarizing film 112. Therefore, light is output with respect to only the second half of each sub-pixel.

For example, as shown in FIG. 5B, as the polarizing panel 111 is turned off, the light provided from the BLU may have a polarization direction of "↕" and may be output with respect to only areas 431, 432, and 433 of the polarizing film 112 corresponding to the corresponding polarization direction. Therefore, the light provided from the BLU may penetrate only the area 432 of the polarizing film 112 corresponding to the second half 412 of the sub-pixel 410, and thus light corresponding to the second half 412 of the sub-pixel 410 may be incident onto the other one of the left and right eyes of the user so as to realize a 3D image.

However, the above-described exemplary embodiment is only an example, and a driving state for turning on and/or off the polarizing panel 111 and polarization of the polarizing panel 111 may be variously modified within the scope of the exemplary embodiments.

Therefore, half of a whole visual field may be formed in a first sub field section of one image frame section, and the other half of the visual field may be formed in a second sub field section of the image frame section. Therefore, a thickness of the glass used to maintain a distance between a display panel and a visual field divider may be reduced to half. Also, a tolerance of the glass is reduced due to the reduction in the thickness of the glass, and thus uniformity of the glass may be secured to improve a 3D performance.

Figure 6:
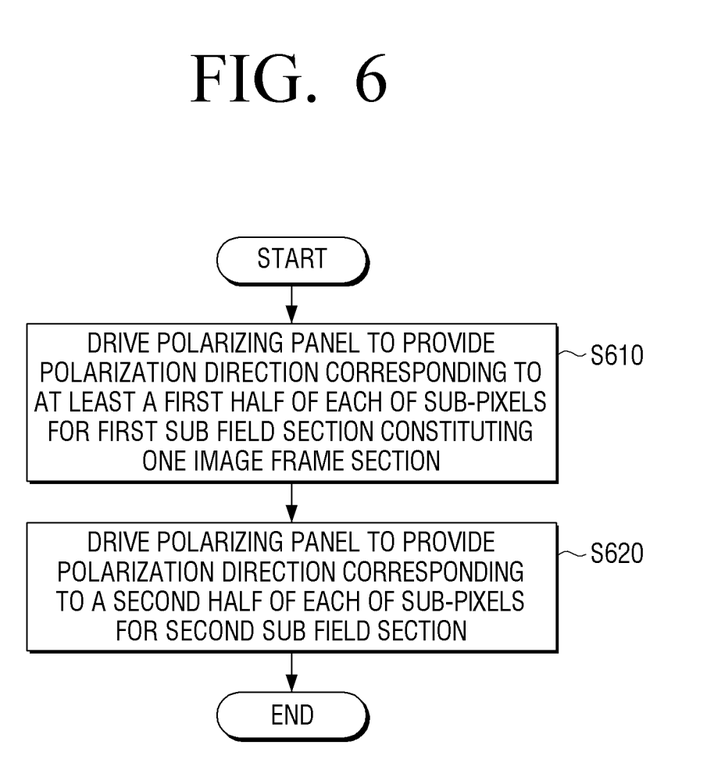
FIG. 6 is a flowchart illustrating a method of controlling a display apparatus, according to an exemplary embodiment.

FIG. 6 is a flowchart illustrating a method of controlling a display apparatus, according to an exemplary embodiment.

Referring to FIG. 6, the display apparatus includes a display panel that includes a plurality of pixels, and arranges and displays a multi-view image in a preset arrangement pattern and a polarizing film that is disposed on a back surface of the display panel and transmits light having a first polarization direction in an area corresponding to at least a first part of each of the sub-pixels of a plurality of pixels, and light having a second polarization direction in areas corresponding to at least a second part of each of the sub-pixels constituting the plurality of pixels. In operation S610, the display apparatus drives a polarizing panel that is disposed on a back surface of the polarizing film to provide polarization directions corresponding to at least a first half of each of the sub-pixels for a first sub field section constituting one image frame section.

In operation S620, the display apparatus drives the polarizing panel to provide a polarization direction corresponding to the second part of each of the sub-pixels for a second sub field section constituting the one image frame section.

Here, the polarizing film may be constituted to transmit light having a first polarization direction in a first half of each of the sub-pixels and transmit light having a second polarization direction perpendicular to the first polarization direction in the second half of each of the sub-pixels.

In this case, in operations S610 and S620, the display apparatus may drive the polarizing panel to sequentially provide a first polarization direction in the first sub field section corresponding to a first half of the sub-pixel and a second polarization direction in the second sub field section corresponding to a second half of the sub-pixel.

The polarizing panel may be realized as an active retarder that switches P waves and S waves.

Also, the display apparatus may further include a BLU that is disposed on a back surface of the polarizing panel to emit light. In this case, in operations S610 and S620, the display apparatus may drive the polarizing panel to sequentially provide the light emitted from the BLU to the polarizing film in different polarization directions for one image frame section.

The display apparatus may further include a visual field divider that is disposed on a front surface of the display panel to provide different views according to viewing areas based on a multi-view image.

The display apparatus may further include a glass unit that is disposed between the visual field divider and the display panel.

According to various exemplary embodiments as described above, in a glassless type system, a thickness of a medium that maintains a distance between a 2D panel and a 3D filter may be reduced, and a 3D performance may be maintained.

A method of controlling a display apparatus according to the above-described exemplary embodiments may be embodied as a program and then provided to the display apparatus.

For example, there may be provided a non-transitory computer-readable medium that stores a program executing a structure providing a polarization direction corresponding to at least a part of each of sub-pixels for a first sub field section and a polarization direction corresponding to the other part of each of the sub-pixels for a second sub field section of an image frame section.

The non-transitory computer-readable medium refers to a medium which does not store data for a short time such as a register, a cache memory, a memory, or the like but semi-permanently stores data and is readable by a device. In detail, the above-described various applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display panel comprising a plurality of pixels, and configured to display a multi-view image, each of the plurality of pixels including a plurality of sub-pixels;
a polarizing film disposed on a back surface of the display panel and configured to transmit light of a first polarization direction to a first area corresponding to a first part of each of the sub-pixels, and light of a second polarization direction to a second area corresponding to a second part of each of the sub-pixels;
a polarizing panel disposed on a back surface of the polarizing film;
a backlight unit disposed on a back surface of the polarizing panel and configured to emit light; and
a controller configured to control a driving state of the polarizing panel to sequentially provide the light emitted from the backlight unit by the first polarization direction and the second polarization direction for an image frame section,
wherein the image frame section comprises a first sub field section and a second sub field section,
wherein the light of the first polarization direction is provided in the first sub field section and the light of the second polarization direction is provided in the second sub field section,
wherein the light of the first polarization direction is blocked in the second area of the polarizing film in the first sub field section, and
wherein the light of the second polarization direction is blocked in the first area of the polarizing film in the second sub field section.

2. The display apparatus of claim 1, wherein:
the first area corresponds to a first half of each of the sub-pixels and, the second area corresponds to a second half of each of the sub-pixels,
the second polarization direction is perpendicular to the first polarization direction.

3. The display apparatus of claim 2, wherein the controller is configured to provide a multi-view image displayed in the first half of each of the sub-pixels in the first sub field section and a multi-view image displayed in the second half of each of the sub pixels in the second sub field section for the image frame section.

4. The display apparatus of claim 1, wherein the polarizing panel comprises an active retarder configured to switch P waves and S waves.

5. The display apparatus of claim 1, further comprising:
a visual field divider disposed on the display panel and configured to provide different views according to viewing areas based on the multi-view image.

6. The display apparatus of claim 5, further comprising:
a glass unit disposed between the visual field divider and the display panel.

7. The display apparatus of claim 1, wherein the polarizing panel is configured to be turned on for providing the first polarization direction such that light provided from a backlight unit is output in the same direction as a transmission axis of the polarizing film, and is configured to be turned off for providing the second polarization direction such that light provided from the backlight unit is output in the same direction as an absorption axis of the polarization film.

8. The display apparatus of claim 1, wherein the first polarization direction and the second polarization direction are different from each other.

9. A method of controlling a display apparatus comprising a display panel that comprises a plurality of pixels, and displays a multi-view image, a polarizing film that is disposed on a back surface of the display panel and transmits light of different polarization directions, and a polarizing panel disposed on a back surface of the polarizing film, the method comprising:
driving the polarizing panel to provide to the polarizing film light having a first polarization direction corresponding to at least a first part of each of sub-pixels constituting the plurality of pixels in a first sub field section of an image frame section; and
driving the polarizing panel to provide to the polarizing film light of a second polarization direction corresponding to a second part of each of the sub-pixels constituting the plurality of pixels in a second sub field section of the image frame section,
wherein the light of the first polarization direction is blocked in the second area of the polarizing film in the first sub field section, and
wherein the light of the second polarization direction is blocked in the first area of the polarizing film in the second sub field section.

10. The method of claim 9, wherein the first area corresponds to a first half of each of the sub-pixels and, the second area corresponds to a second half of each of the sub-pixels, and
wherein the polarizing panel is driven to sequentially provide the first polarization direction in the first sub field section and the second polarization direction in the second sub field section.

11. The method of claim 9, wherein the polarizing panel is an active retarder configured to switch P waves and S waves.

12. The method of claim 9, wherein the display apparatus further comprises a back light unit (BLU) disposed on a back surface of the polarizing panel in order to emit light,
wherein the polarizing panel is driven to sequentially provide the polarizing film with the light emitted from the BLU in the first polarization direction and the second polarization direction for the one image frame section.

13. The method of claim 9, wherein the display apparatus further comprises a visual field divider disposed on a front surface of the display panel to provide different views according to viewing areas based on a multi-view image.

14. The method of claim 13, wherein the display apparatus further comprises a glass unit disposed between the visual field divider and the display panel.

15. A display apparatus comprising:
a display panel which comprises a plurality of pixels and is configured to display a multi-view image, each of the plurality pixels including a plurality of sub-pixels;
a polarizing film which is disposed on the display panel, and is configured to transmit, to the display panel, light of a first polarization direction in an area corresponding to a first half of a sub-pixel of the plurality of sub-pixels, and to transmit light of a second polarization direction in an area corresponding to a second half of the sub-pixel;

a polarizing panel which is disposed on the polarizing film and configured to sequentially provide the light of the first and second polarization directions to the polarizing film; and a visual field divider which is disposed on the display panel and is configured to provide the multi-view image, wherein the image frame section comprises a first sub field section and a second sub field section, wherein the light of the first polarization direction is provided in the first sub field section and the light of the second polarization direction is provided in the second sub field section, wherein the light of the first polarization direction is blocked in the second area of the polarizing film in the first sub field section, and wherein the light of the second polarization direction is blocked in the first area of the polarizing film in the second sub field section.

16. The display apparatus of claim 15, further comprising a controller configured to control a driving state of the polarizing panel.

17. The display apparatus of claim 15, wherein the visual field divider is at least one of a lenticular lens and a parallax barrier.

18. The display apparatus of claim 15, wherein the first polarization direction is perpendicular to the second polarization direction.

19. The display apparatus of claim 15, wherein the polarizing panel comprises an active retarder configured to switch P waves and S waves.

20. The display apparatus of claim 15, wherein a glass unit disposed between the visual field divider and the display panel.

* * * * *